(12) United States Patent
Kosaraju et al.

(10) Patent No.: US 8,917,840 B2
(45) Date of Patent: Dec. 23, 2014

(54) ENHANCED PRIVACY CALLER IDENTIFICATION SYSTEM

(75) Inventors: Ravi K. Kosaraju, Johnston, RI (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1391 days.

(21) Appl. No.: 12/636,985

(22) Filed: Dec. 14, 2009

(65) Prior Publication Data

US 2011/0142218 A1   Jun. 16, 2011

(51) Int. Cl.
*H04M 1/56* (2006.01)
*H04L 9/32* (2006.01)
*H04M 1/725* (2006.01)

(52) U.S. Cl.
CPC .......... *H04L 9/3236* (2013.01); *H04L 2209/60* (2013.01); *H04M 1/72547* (2013.01)
USPC .............................. 379/142.02; 379/142.04

(58) Field of Classification Search
CPC . H04M 2201/40; H04M 3/36; H04M 1/6505; H04M 2201/60; H04M 3/533; H04M 1/576; H04M 1/57
USPC ........ 379/88.21, 88.2, 142.02, 142.06, 88.01, 379/88.09, 88.1, 88.14, 88.19, 88.23, 379/142.04, 142.14
See application file for complete search history.

(56) References Cited

U.S. PATENT DOCUMENTS

| | | | |
|---|---|---|---|
| 5,289,542 A | 2/1994 | Kessler | |
| 6,009,177 A | 12/1999 | Sudia | |
| 6,553,110 B1 * | 4/2003 | Peng | 379/210.03 |
| 6,731,733 B2 * | 5/2004 | Haran | 379/201.11 |
| 6,857,075 B2 | 2/2005 | Patel | |
| 6,987,845 B1 * | 1/2006 | Van Natter et al. | 379/126 |
| 7,463,727 B2 | 12/2008 | Urban et al. | |
| 2005/0282578 A1 * | 12/2005 | Vander Veen et al. | 455/551 |
| 2005/0283497 A1 * | 12/2005 | Nurminen et al. | 707/104.1 |
| 2006/0153348 A1 * | 7/2006 | Marappan | 379/88.19 |
| 2007/0036296 A1 * | 2/2007 | Flanagan et al. | 379/88.19 |

(Continued)

FOREIGN PATENT DOCUMENTS

WO   WO2008015723 A2   2/2008

OTHER PUBLICATIONS

Siemens AG, Juergen Carstens, "A Method of Calling a Party Without Identifying the Caller to Others", Siemens AG 2009, IP.com, Inc., 3 pages.

(Continued)

*Primary Examiner* — Fan Tsang
*Assistant Examiner* — Akelaw Teshale
(74) *Attorney, Agent, or Firm* — Thomas E. Tyson; Jeffrey L. Streets

(57) ABSTRACT

A first telephone number assigned to the first telephone is cryptographically hashed to generate a first message digest, and the first telephone sends a signal to a second telephone over a communication network, wherein the signal includes the first message digest. The second telephone receives the first signal and searches its contact records to determine whether a telephone number in one of the contact records generates a message digest that matches the message digest received. Then, in response to the second telephone determining that a telephone number in one of the contact records generates a message digest that matches the first message digest, the second telephone identifies the contact record that generates the matching message digest and provides audible or visual output of content from the identified contact record.

13 Claims, 3 Drawing Sheets

(56) References Cited

U.S. PATENT DOCUMENTS

| | | |
|---|---|---|
| 2007/0234062 A1 | 10/2007 | Friedline |
| 2007/0282573 A1* | 12/2007 | Fritz et al. .......................... 703/2 |
| 2008/0020742 A1* | 1/2008 | Vander Veen et al. ......... 455/415 |
| 2008/0052488 A1* | 2/2008 | Fritz et al. ..................... 711/216 |
| 2008/0102793 A1* | 5/2008 | Ananthanarayanan et al. ............................ 455/411 |
| 2009/0022155 A1* | 1/2009 | Rosenberg et al. ........... 370/392 |

OTHER PUBLICATIONS

Agarwal, et al. "Wireless Wakeups Revisited: Energy Management for VoIP over Wi-Fi Smartphones", Jun. 2007, pp. 179-191.

Wikipedia, "Cryptographic Hash Function", http://en.wikipedia.org/wiki/Cryptographic_hash_function, Dec. 3, 2009, 8 pages.

* cited by examiner

ENHANCED PRIVACY CALLER IDENTIFICATION SYSTEM

BACKGROUND

1. Field of the Invention

The present invention relates to caller identification systems.

2. Background of the Related Art

Caller identification (referred to as caller ID), or calling number identification, is a telephone service that provides a caller's telephone number to a called party's telephone during the ringing signal or as the call is set up. Some telephone services will also provide the called party's telephone with a name associated with the calling telephone number. Typically, called party's telephone will display the calling party's telephone number and/or name, so that the called party may determine whether or not to answer the call. Still further, the called party's telephone may store caller ID records so that the called party's telephone can easily retrieve and use the calling party's telephone number in the future.

Although the implementation of caller ID provides tremendous advantages for many users, there are instances where a user may prefer not to share their telephone number and name with a called party. Accordingly, telephone service providers may offer a privacy feature, such as the vertical service code "*67" which blocks presentation of the caller ID information to the called party's telephone. If the user wants to block their caller ID information from being presented to any called party's telephone, then the user may register their telephone number as a "private number" with the telephone service provider.

The availability of caller ID has also allowed users to block calls from undesired originating telephone numbers. For example, telephone service providers may allow a user block calls by registering a list of blocked telephone numbers with the telephone service provider. When a call is directed to the user's telephone number, the telephone service provider searches any registered list of blocked number to determine whether or not to forward the call to the user's telephone. If the calling party's telephone number is on the called party's registered block list, then the call is immediately dropped. In this manner, a user can avoid repeated calls from disfavored marketers or harassing individuals.

However, individuals and companies whose calls have been blocked may resort to caller ID spoofing in which the caller ID information is altered so that the call appears to originate from a different caller, or at least avoids the user's registered block list. Although spoofing may be illegal is some contexts, individual users are unlikely to take independent legal action and simply prefer to avoid receiving such calls.

BRIEF SUMMARY

One embodiment of the present invention provides a method comprising a first telephone cryptographically hashing a first telephone number assigned to the first telephone to generate a first message digest, and the first telephone sending a first signal to a second telephone over a communication network, wherein the first signal includes the first message digest. The method further comprises the second telephone receiving the first signal and searching contact records stored by the second telephone to determine whether a telephone number in one of the contact records generates a message digest that matches the first message digest. Then, in response to the second telephone determining that a telephone number in one of the contact records generates a message digest that matches the first message digest, the second telephone identifying the contact record that generates the matching message digest and providing audible or visual output of content from the identified contact record. Optionally, the second telephone stores a message digest in the same contact record as the telephone number used to generate the message digest.

Another embodiment of the invention provides a computer program product including computer usable program code embodied on a computer usable storage medium for managing telephone calls. The computer program product comprises computer usable program code for cryptographically hashing a telephone number to generate a message digest. Computer usable program code is also provided for sending an outgoing call signal to a remote target telephone over a communication network, wherein the outgoing call signal includes a message digest generated by cryptographically hashing the telephone number stored in a local subscriber identity module (SIM). Further computer usable program code allows for receiving an incoming call signal from a remote source telephone over the communication network, wherein the incoming call signal includes a message digest generated by cryptographically hashing the telephone number of the remote source telephone. The computer program product further comprises computer usable program code for identifying a contact record including a telephone number that is cryptographically hashed to generate a digest message matching the message digest included in the incoming call signal, and computer usable program code for providing audible or visual output of content from the identified contact record.

DETAILED DESCRIPTION

Figure 1:
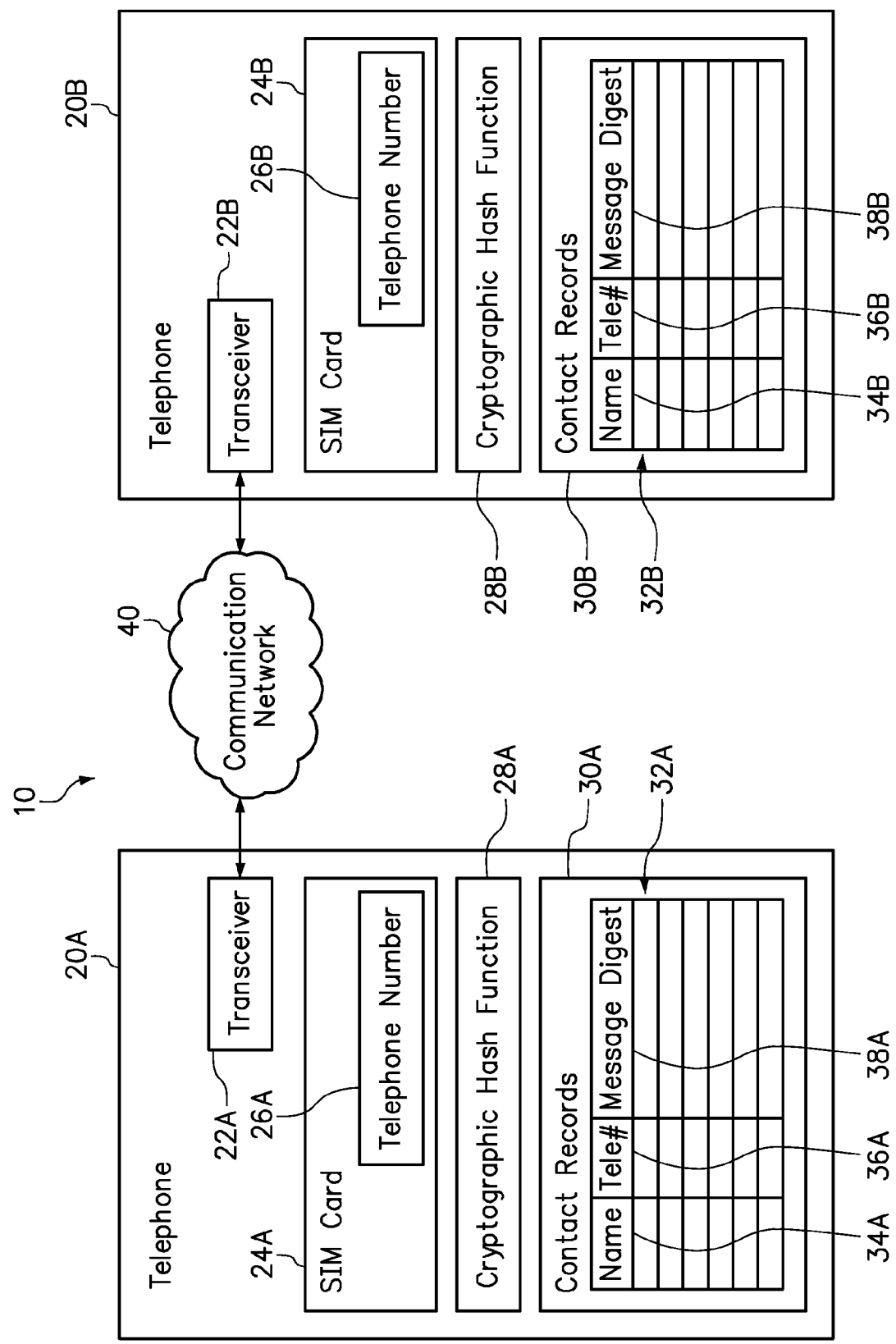
FIG. 1 is a schematic diagram of a first telephone communicating with a second telephone over a communication network.

One embodiment of the present invention provides a method comprising a first telephone cryptographically hashing a first telephone number assigned to the first telephone to generate a first message digest, and the first telephone sending a first signal to a second telephone over a communication network, wherein the first signal includes the first message digest. The method further comprises the second telephone receiving the first signal and searching contact records stored by the second telephone to determine whether a telephone number in one of the contact records generates a message digest that matches the first message digest. Then, in response to the second telephone determining that a telephone number in one of the contact records generates a message digest that matches the first message digest, the second telephone identifying the contact record that generates the matching message digest and providing audible or visual output of content from the identified contact record. Optionally, the second telephone stores a message digest in the same contact record as the telephone number used to generate the message digest.

It should be understood that the description of the present invention makes reference to a communication between a first telephone and a second telephone. The description generally treats the first telephone as the telephone of the calling party and the second telephone as the telephone of the called party, but typically either telephone will be able to both place and receive calls in the manner describe. Accordingly, the distinction between a first telephone and a second telephone is used for convenience of separating the tasks performed by the telephone in any one call or attempted call. Other discussions that follow may make reference to a calling party's telephone and a called party's telephone.

The method may be implemented in any communication network that is able to support caller ID and possibly could be implemented in even other communication networks since embodiments of the invention do not necessarily rely upon the telephone service provider to provide the caller ID information, call blocking registry, and the like. Rather, the present invention may be implemented by the telephones at the originating and receiving endpoints of a call signal. For example, the communication network may include an integrated services digital network (ISDN), a mobile telephone network, or a packet-switched network, such as the Internet, that supports voice over Internet Protocol (VoIP). Other networks and communication standards might also be used, whether currently existing or developed in the future.

The method involves the use of message digests generated by cryptographically hashing a telephone number or other unique identification of the physical telephone device or unique identification of the telephone service or account. A cryptographic hash function is a well known procedure that takes a message input and returns output having a fixed-size bit string. Any difference in the message input will result in a different output, known as the hash value or message digest. An ideal cryptographic hash function is easy to compute and makes it infeasible to: (1) determine the message input from the message digest, (2) modify a message input without a resulting change in the message digest, and (3) find two different message inputs that will result in the same message digest.

It should be appreciated that various embodiments of the present invention may provide one or more of the following advantages. One optional advantage is that called parties may be able to add source of a call to a list of blocked callers, even when the caller's number is protected. This may be implemented by the called party receiving an incoming call signal that includes a message digest of the calling party's telephone number and storing that message digest in a block list in order to block future calls that are accompanied by that particular message digest. Another optional advantage is that a called party's telephone may be able to provide the called party with full caller ID information for incoming calls from a person they know. This advantage may be implements by the called party storing a contact record containing at least the telephone number of a person they want to receive calls from. If an incoming call signal includes a message digest that matches a message digest generated from a telephone number in a contact record, then information from the contact record may be displayed or provided to the called party.

Yet another optional advantage of one or more embodiments is that calling parties may be protected against mistakenly disclosing their telephone number when they accidentally dial a wrong number. Since the outgoing call signal includes a message digest of the calling party's telephone number instead of their actual telephone number, the called party is only presented with the calling party's telephone number if the called party has a contact record with the calling party's telephone number or corresponding message digest. This will presumably not occur for a wrong number.

In systems where a called party's telephone may respond to a call signal with the called party's caller ID information, one or more embodiments of the invention may include the called party's telephone providing a message digest of the called party's telephone number, such that the called party will not disclose their identity to callers that do not already posses the called party's contact information, and a calling party can use the message digest from the called party's telephone to verify that the called party is the intended recipient of the call. According to such embodiments, the telephones at the originating and receiving endpoints of the call will exchange message digests generated from their respective telephone numbers. If the message digest received from the remote side of the exchange matches the message digest generated and associated with one of the locally stored contacts, the contact record for the matched message digest will be displayed on the caller ID system.

In a further embodiment, the method may further comprise the second telephone providing audible or visual output indicating that the identity of the first telephone cannot be determined, in response to the second telephone determining that no telephone number in any of the contact records generates a message digest that matches the first message digest. Optionally, such audible or visual output may also include the user with various options for handling the call.

In another embodiment, the method may further comprise the second telephone cryptographically hashing a telephone number in a selected contact record stored by the second telephone to generate a message digest. The message digest generated from a telephone number in the contact record is thus available for comparison against the message digest in an incoming call signal. Still further, the second telephone may store a message digest in the same contact record as the telephone number used to generate the message digest. Storing the message digest in this manner prevents the need to repeatedly generate a message digest from the same telephone number.

In yet another embodiment, the method may further comprise the second telephone storing a message digest in a block list, and blocking all calls containing a message digest that us stored in the block list. Accordingly, the message digest in an incoming call signal is compared against message digests in the block list and, if there is a match, the call is blocked.

In a further optional embodiment, the method may allow a user to disable a privacy mode, such that the first call signal further includes the first telephone number. This embodiment may be useful where the calling party intends to share their caller ID information with the calling party for future use.

Another embodiment of the invention provides a computer program product including computer usable program code embodied on a computer usable storage medium for managing telephone calls. The computer program product comprises computer usable program code for cryptographically hashing a telephone number to generate a message digest. Computer usable program code is also provided for sending an outgoing call signal to a remote target telephone over a communication network, wherein the outgoing call signal includes a message digest generated by cryptographically hashing the telephone number stored in a local subscriber identity module. Further computer usable program code allows for receiving an incoming call signal from a remote source telephone over the communication network, wherein the incoming call signal includes a message digest generated by cryptographically hashing the telephone number of the remote source telephone. The computer program product further comprises computer usable program code for identifying a contact record including a telephone number that is cryptographically hashed to generate a digest message matching the message digest included in the incoming call signal, and computer usable program code for providing audible or visual output of content from the identified contact record.

The computer program product may be installed on a telephone system or individual telephone. One or more aspects of the computer program product may be used at any one time, or in the handling of any one call. For example, the computer usable program code for sending an outgoing call signal is used when the telephone is used to initiate a call, whereas the computer usable program code for receiving an incoming call signal is used when the telephone receives a call.

Optionally, the computer program product may further include computer usable program code for providing audible or visual output indicating failure to identify a contact record including a telephone number that is cryptographically hashed to generate a digest message matching the message digest included in the incoming call signal. In a separate option, the computer program product may include computer usable program code for storing a message digest in the same contact record as the telephone number used to generate the message digest. When handling subsequent incoming calls, the stored message digest prevents the need to generate the message digest from the telephone number.

Still further, the computer program product may comprise computer usable program code for receiving a user instruction to block calls from the same telephone as a most-recently received call, computer usable program code for storing the message digest that is included in the incoming call signal in a block list, and computer usable program code for blocking calls containing a message digest stored in the block list. It should be emphasized that this embodiment allows a telephone to block calls coming from another originating telephone without requiring knowledge of the originating telephone's telephone number. The message digest generated from the originating telephone number is sufficient to effectively block further calls from the originating telephone.

In yet another option, the computer program product may further comprise computer usable program code for receiving a user instruction for the outgoing call signal to include the telephone number stored in a local subscriber identity module. Such as user instruction might be reference to as an instruction to disable a privacy function. In one implementation, computer usable program code may send the outgoing call signal with the telephone number stored in a local subscriber identity module instead of the message digest generated by cryptographically hashing the telephone number stored in a local subscriber identity module in response to receiving the user instruction to include the telephone number in the outgoing call signal.

FIG. 1 is a schematic diagram of a system 10 comprising a first telephone 20A communicating with a second telephone 20B over a communication network 40. As shown, the first and second telephones 20A, 20B are shown as being of identical construction. Accordingly, the following description of the first telephone 20A is equally application to the second telephone 20B, where like reference numerals are used to show like components except for the separate designation of "A" (for the first telephone) and "B" (for the second telephone). It should be recognized that the telephone numbers stored in SIM Cards will be unique and that the contents of the contact records will typically be customized by each user.

The first telephone 20A includes a transceiver 22A for transmitting and receiving call signals over the communication network 40, which may include one or more sub-networks of the same or different type. A SIM Card 24A stores, among other things, a unique telephone number 28A assigned to the telephone 20A. In accordance with embodiments of the present invention, a cryptographic hash function 28A is provided, in either hardware or software, in order to generate message digests. The telephone further includes memory that stores contacts records 30A, including separate records (rows) for each contact (such as a row shown at 32A). Each record preferably includes a contact name 34A, a telephone number associated with the contact name 36A, and a message digest 38A which is generated by cryptographically hashing the telephone number from the same record. According to the previous description of various embodiments, it will be understood that the stored message digests 38A may be generated by the cryptographic hash function 28A of the first telephone 20A and stored in the contact records 30A, or generated by the cryptographic hash function 28B of the second telephone 20B and stored in the contact records 30A after receiving an incoming call signal from the second telephone that includes the relevant message digest. Because the cryptographic hash functions are the same, the message digest of a particular telephone number will be the same regardless of whether it is generated by the first telephone 20A or the second telephone 20B.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
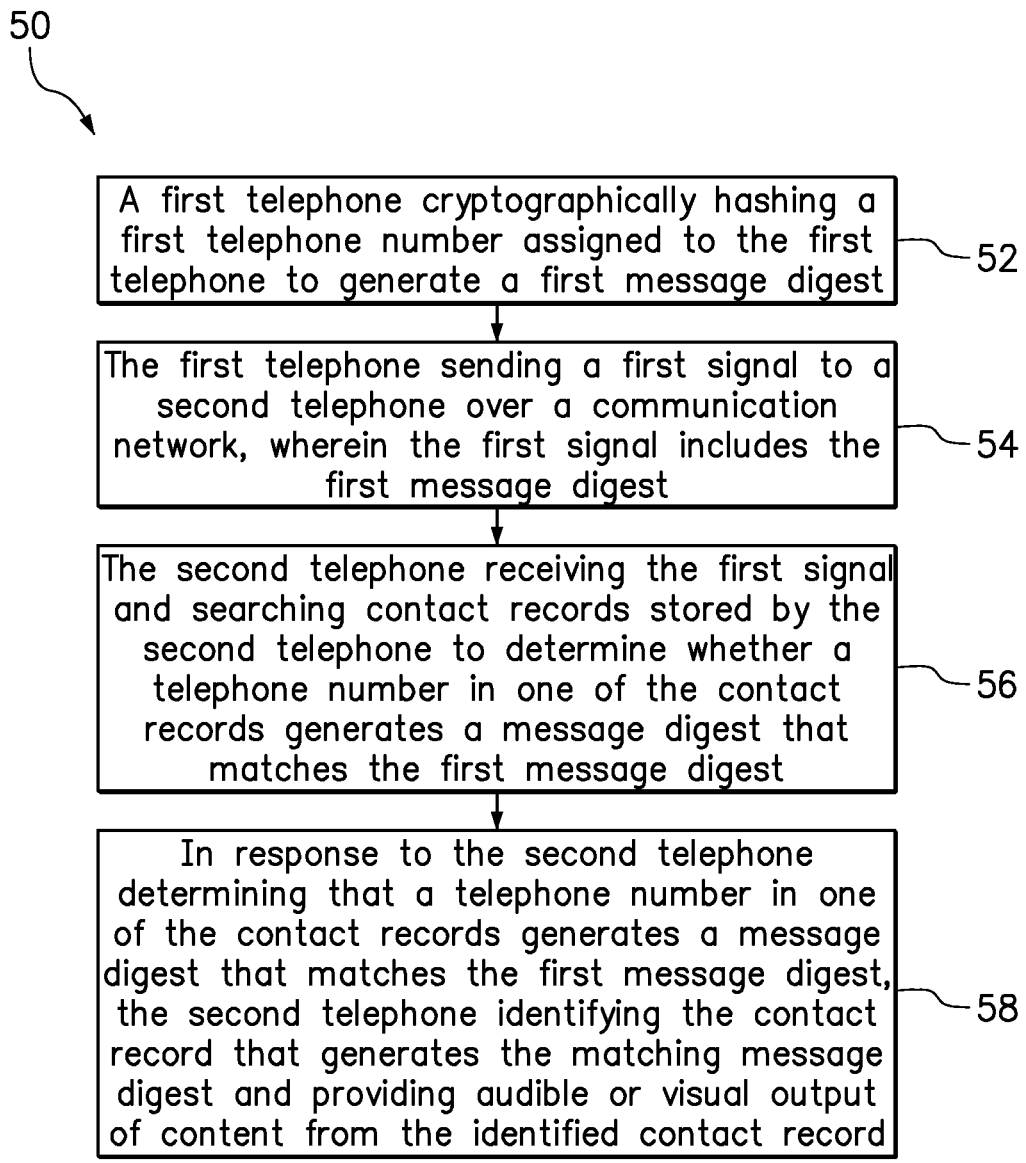
FIG. 2 is a flowchart of a method in accordance with one embodiment of the present invention.

FIG. 2 is a flowchart of a method 50 in accordance with one embodiment of the present invention. In step 52, a first telephone cryptographically hashes a first telephone number assigned to the first telephone to generate a first message digest. In step 54, the first telephone sends a first signal to a second telephone over a communication network, wherein the first signal includes the first message digest. The second telephone receives the first signal in step 56, and searches contact records stored by the second telephone to determine whether a telephone number in one of the contact records generates a message digest that matches the first message digest. Then in step 58, in response to the second telephone determining that a telephone number in one of the contact records generates a message digest that matches the first message digest, the second telephone identifying the contact record that generates the matching message digest and providing audible or visual output of content from the identified contact record.

Figure 3:
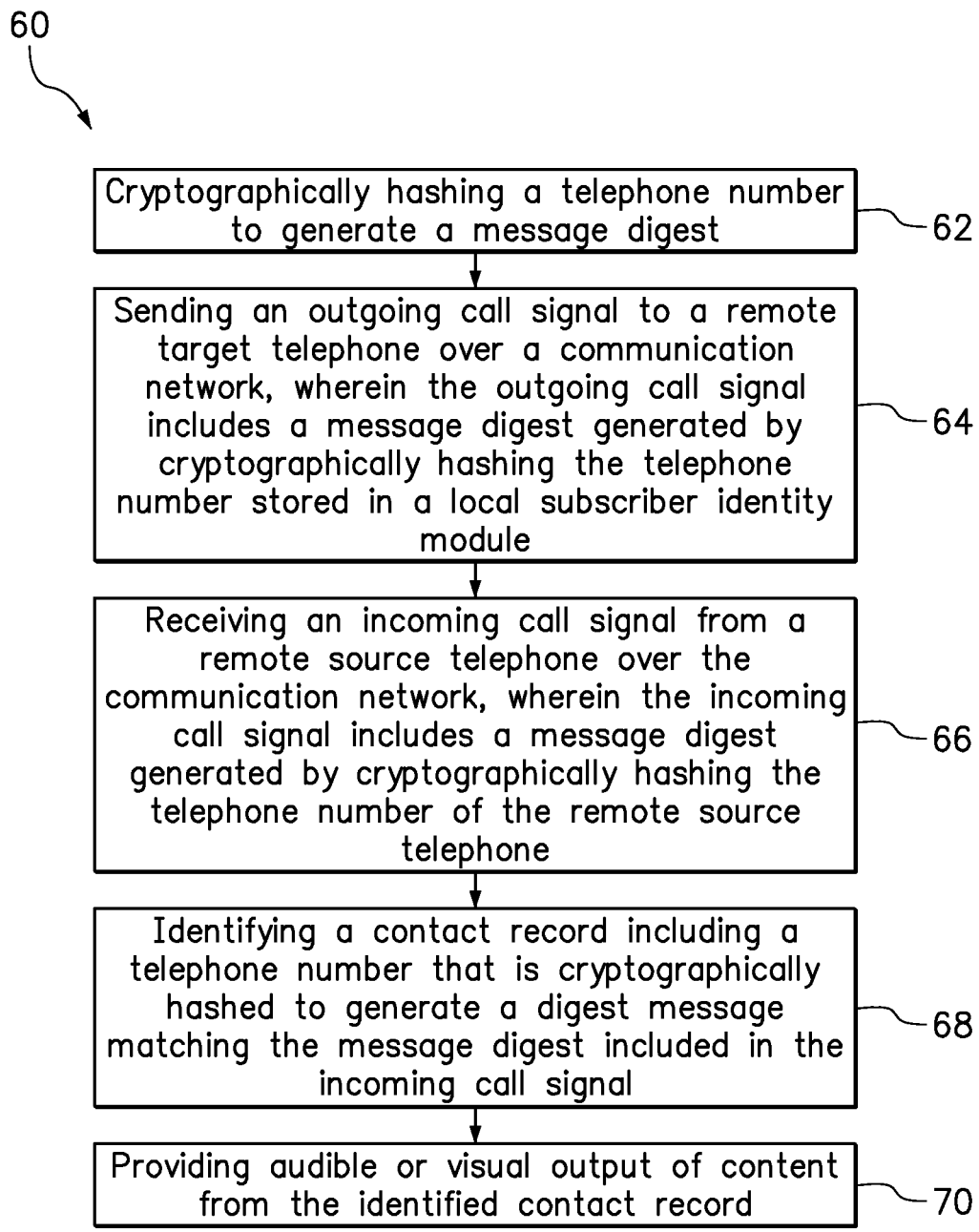
FIG. 3 is a flowchart of a method in accordance with another embodiment of the present invention.

FIG. 3 is a flowchart of a method 60 in accordance with another embodiment of the present invention. Step 62 includes cryptographically hashing a telephone number to generate a message digest. Step 64 sends an outgoing call signal to a remote target telephone over a communication network, wherein the outgoing call signal includes a message digest generated by cryptographically hashing the telephone number stored in a local subscriber identity module. An incoming call signal is received from a remote source telephone over the communication network in step 66, wherein the incoming call signal includes a message digest generated by cryptographically hashing the telephone number of the remote source telephone. Step 68 identifies a contact record including a telephone number that is cryptographically hashed to generate a digest message matching the message digest included in the incoming call signal. In step 70, audible or visual output is provided of content from the identified contact record.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   a first telephone cryptographically hashing a first telephone number assigned to the first telephone to generate a first message digest;
   the first telephone sending a first signal to a second telephone over a communication network, wherein the first signal includes the first message digest;
   the second telephone receiving the first signal and searching contact records stored by the second telephone to determine whether a telephone number in one of the contact records generates a message digest that matches the first message digest; and
   in response to the second telephone determining that a telephone number in one of the contact records generates a message digest that matches the first message digest, the second telephone identifying the contact record that generates the message digest that matches the first message digest and providing audible or visual output of content from the identified contact record.

2. The method of claim 1, further comprising:
   in response to the second telephone determining that no telephone number in any of the contact records generates a message digest that matches the first message digest, the second telephone providing audible or visual output indicating that the identity of the first telephone cannot be determined.

3. The method of claim 1, further comprising:
   the second telephone cryptographically hashing a telephone number in a selected contact record stored by the second telephone to generate a message digest.

4. The method of claim 3, further comprising:
   the second telephone storing a message digest in the same contact record as the telephone number used to generate the message digest.

5. The method of claim 1, further comprising:
   the second telephone storing a message digest in a block list; and
   the second telephone blocking all calls containing a message digest stored in the block list.

6. The method of claim 1, wherein the first telephone accesses the first telephone number from a subscriber identity module.

7. The method of claim 1, wherein the first signal further includes the first telephone number when a user of the first telephone disables a privacy mode.

8. A computer program product including computer usable program code embodied on a non-transitory computer readable storage medium for managing telephone calls, the computer program product comprising:
   computer usable program code for cryptographically hashing a telephone number to generate a message digest;
   computer usable program code for sending an outgoing call signal to a remote target telephone over a communication network, wherein the outgoing call signal includes a message digest generated by cryptographically hashing the telephone number stored in a local subscriber identity module;
   computer usable program code for receiving an incoming call signal from a remote source telephone over the communication network, wherein the incoming call signal includes a message digest generated by cryptographically hashing the telephone number of the remote source telephone;
   computer usable program code for identifying a contact record including a telephone number that is cryptographically hashed to generate a digest message matching the message digest included in the incoming call signal; and
   computer usable program code for providing audible or visual output of content from the identified contact record.

9. The computer program product of claim 8, further comprising:
   computer usable program code for providing audible or visual output indicating failure to identify a contact record including a telephone number that is cryptographically hashed to generate a digest message matching the message digest included in the incoming call signal.

10. The computer program product of claim 8, further comprising:
    computer usable program code for storing a message digest in the same contact record as the telephone number used to generate the message digest.

11. The computer program product of claim 8, further comprising:
    computer usable program code for receiving a user instruction to block calls from the same telephone as a most-recently received call;
    computer usable program code for storing the message digest that is included in the incoming call signal in a block list; and
    computer usable program code for blocking calls containing a message digest stored in the block list.

12. The computer program product of claim 8, further comprising:
    computer usable program code for receiving a user instruction for the outgoing call signal to include the telephone number stored in a local subscriber identity module.

13. The computer program product of claim 12, further comprising:
    computer usable program code for sending the outgoing call signal with the telephone number stored in a local subscriber identity module instead of the message digest generated by cryptographically hashing the telephone number stored in a local subscriber identity module in response to receiving the user instruction to include the telephone number in the outgoing call signal.

* * * * *